Jan. 20, 1970  J. W. JONES  3,491,247
ACCURATE ONCE-AROUND PULSE GENERATING SYSTEM
Filed June 7, 1967
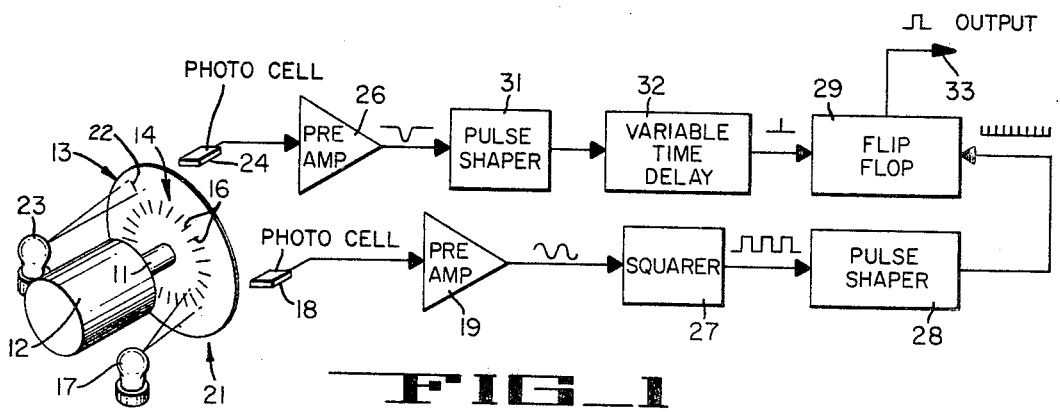
FIG_1
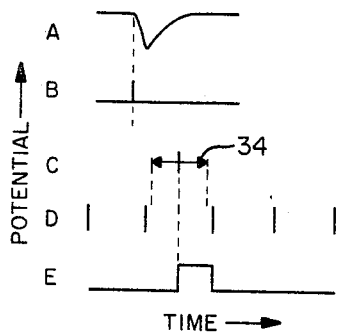
FIG_2
INVENTOR.
JAMES W. JONES
BY *Robert L. Clay*
ATTORNEY United States Patent Office 3,491,247
Patented Jan. 20, 1970

3,491,247
ACCURATE ONCE-AROUND PULSE
GENERATING SYSTEM
James W. Jones, Redwood City, Calif., assignor to Ampex Corporation, Redwood City, Calif., a corporation of California
Filed June 7, 1967, Ser. No. 644,234
Int. Cl. G01p *3/48;* G01d *5/34*
U.S. Cl. 250—231   4 Claims

ABSTRACT OF THE DISCLOSURE

An arrangement for generating a pulse for each revolution of a rotary element, i.e., a so-called "once around" pulse, which serves to indicate the rotary position of the element. A high resolution, high frequency pulse train derived from an existing tachometer system rotating with the element is combined with a low resolution, low frequency train of once-around indicator pulses, wherein the high and low resolution pulse trains selectively determine the state of, for example, a flip-flop circuit. The high resolution pulse train provides the time accuracy, whereby once-around pulses having an edge of extreme time or position accuracy are produced.

BACKGROUND OF THE INVENTION

In various applications it is necessary to provide a periodic indication of the position of a rotary element. For example, in accurately controlling the rotational position of an element rotated by an electric motor, indicator pulses representative of the position of the element are compared with reference pulses to develop an error signal proportional to timing differences between the indicator pulses and reference pulses. The error signal is employed to control the rotation of the motor in compensatory relation to the timing differences and thereby control the rotational position of the element. Typically, a tachometer system including a tachometer disc rotating with the element is employed to generate the position indicator pulses. The disc is provided with one or more markers, which in the case of a plurality thereof are circumferentially spaced on the face of the disc. Fixed marker sensing means disposed adjacent the disc sense each marker rotated past same and responsively generate an electrical pulse. Such a pulse is, of course, representative of the rotational position of the rotary element. In some instances a plurality of the markers are appropriately positioned and spaced on the disc such that the sensing means generate a high resolution, high frequency sine wave relative to the rotational velocity of the rotary element. Such a sine wave is typically employed in the control of motor speed to a constant value within close limits. However, the sine wave is not suited to providing an indiction of each revolution of the rotary element, which is of importance, for example, in the synchronization of the element rotation to an external reference of relatively low frequency. In such a case, once-around pulses are typically generated by means of a single marker provided on the tachometer disc. Heretofore, the resulting relatively low frequency once-around pulse train has also been of relatively low resolution, having a time uncertainty of the order of 5 microseconds for a rotational velocity of 60 Hz. While such indicator pulses are sufficiently accurate for many applications, pulses of significantly increased accuracy are sometimes required, for example, when it is necessary to synchronize the rotation of the rotary element to a 60 Hz. reference with a time accuracy of less than 0.1 microsecond.

SUMMARY OF THE INVENTION

The present invention relates to a system for generating low frequency once-around pulses having extremely high resolution, e.g., 60 Hz. pulses having a time accuracy of better than 0.1 microsecond In the accomplishment of this end, the system of the invention is arranged to combine a high frequency, high resolution pulse train derived from an existing tachometer means of a type typically employed for speed control of the rotary element, with a low resolution, low frequency train of once-around pulses to produce the desired high resolution, low frequency once-around pulse train. More particularly, an existing tachometer disc is coupled to the rotary element and provided with a plurality of circumferentially spaced markers arranged to produce a sine wave as they rotate past a sensing element. The disc may be of the magnetic variety wherein the markers are segments of magnetic material and the sensing element is a magnetic head. However, an optical tachometer disc is preferred wherein the markers are comprised of a plurality of circumferentially spaced alternately transparent and opaque segments. A photocell receiving light beamed through the transparent segments serves as the sensing element and generates a relatively high freqeuncy sine wave as the disc rotates. To generate low resolution, low frequency once-around pulses, a single additional marker is provided on the disc at a different radius than the plurality of markers. With the optical tachometer disc the additional marker is provided as a single transparent segment, and a second photocell receives light beamed therethrough once each revolution of the disc. The second photocell thus generates relatively coarse once-around pulses. The once-around pulses are shaped to provide a train of low frequency, relatively low resolution trigger pulses, while the sine wave is appropriately shaped to provide a train of high frequency, fast rise time, high resolution trigger pulses. The trains of low resolution and high resolution trigger pulses are respectively applied to a pair of inputs of a set-reset flip-flop. Each low resolution trigger pulse, for example, resets the flip-flop and the first high resolution pulse following the low resolution pulse for example, sets the flip-flop. The flip-flop then reamins in its set state until the next low resolution pulse, which resets the flip-flop. As a result, the output of the flip-flop is a train of low frequency once-around pulses, each having one edge which is extremely accurate in time, in the present case the trailing edge, by virtue of the high resolution pulse train establishing same.

BRIEF DESCRIPTION OF THE DRAWING

FIGURE 1 is a block diagram of a preferred embodiment of the invention.

FIGURE 2 is a graphical representation of time correlated waveforms appearing at various points of the circuit of FIGURE 1.

DESCRIPTION OF THE PREFERRED EMBODIMENT

Referring to FIGURE 1 in detail, there will be seen to be provided a system for generating pulses representative of the rotational position of a rotary element such as the shaft 11 of an electric motor 12, or an element rotated by the shaft. The system is particularly suited to the generation of relatively low frequency, high resolution once-around pulses representative of each revolution of the shaft with extreme time and position accuracy. In the illustrated case, the system includes an optical tachometer disc 13 coaxially secured to the shaft 11. The disc is conventional in that it is provided with a marker track 14 formed as a plurality of circumferentially spaced alternately transparent and opaque segments defined by a plurality of circumferentially spaced light slits 16 and the disc areas therebetween. A light source 17 is disposed on one side of the disc to beam light on the track 14, while a photocell 18, or equivalent light sensor, is disposed on the opposite side of the disc to receive the light transmitted through the slits. As a result, the photocell generates a relatively high frequency sine wave, which in FIGURE 1, is indicated at the output of a preamplifier 19 preferably coupled to the output of the photocell. The sine wave is representative of the disc rotational velocity and is typically compared to a reference signal to develop a speed error signal for application to a servo system (not shown) employed to control the speed of the motor 12.

Unlike conventional tachometer discs, the disc 13 is provided with a second marker track 21 at a different radius than track 14. The track 21 includes a single marker, which in the present case is provided as a single light slit 22. A light source 23 beams light on the track 21 such that once each revolution of the disc the light is transmitted through slit 22 upon a photocell 24. This photocell generates a low frequency train of relatively coarse low resolution once-around pulses, one of which is indicated in FIGURE 1 at the output of a preamplifier 26 which is preferably coupled to the photocell.

In order to convert the low resolution once-around pulses to high resolution pulses of greatly increased time accuracy, such pulses are combined in a unique manner with high frequency, high resolution pulses derived from the sine wave generated by photocell 18. In this regard, the preamplifier 19 couples the output of photocell 18 to a squarer 27 which converts the since wave to a square wave. A pulse shaper 28 coupled to the output of the squarer, in turn generates a train of very fast rise time high resolution pulses corresponding to the edges of the square wave. These pulses are applied to one input, for example, the set input, of a set-reset flip-flop 29.

The preamplifier 26 couples the output of photocell 24 to a pulse shaper 31 which produces a trigger pulse in response to each once-around pulse. Due to the coarseness of the once-around pulses, the time accuracy of the corresponding trigger pulses is relatively low. The trigger pulses at the output of pulse shaper 31 are coupled, preferably by means of a variable time delay 32, to the other input of flip-flop 29, in this case the reset input. The time delay 32 serves to compensate for any inaccuracy in the positioning of slit 22 and adjusts the trigger pulses to a nominal position midway between two successive pulses of the high frequency, high resolution pulse train from pulse shaper 28. It will be thus appreciated that each trigger pulse from the variable time delay 32 resets the flip-flop 29 to thereby shift the potential level at the output 33 thereof. The immediately following high resolution pulse from pulse shaper 28 sets the flip-flop to shift the potential at the output to its original level and thereby terminate an output pulse. The flip-flop remains in its set condition until the next trigger pulse is delivered from the time delay to reset the flip-flop. Consequently, the flip-flop output is a low frequency train of once around pulses, each having a trailing edge of extreme time accuracy by virtue of its being produced by one of the high resolution pulses from shaper 28 setting the flip-flop.

The hereinbefore described operation of the once-around pulse generating system will be better understood upon reference to the illustrative waveforms of FIGURE 2. Waveform (a) depicts one of the relatively coarse once-around pulses at the output of preamplifier 26. Waveform (b) illustrates the corresponding trigger pulse produced at the output of pulse shaper 31 at some time along the leading edge of the once-around pulse of waveform (a). Waveform (c), by means of the arrow 34, depicts the adjustability of the position of the trigger pulse facilitated by variable time delay 32. The trigger pulse of waveform (c)) is shown in an adjusted nominal position midway between two successive pulses of waveform (d) which is the high frequency, high resolution train of pulses generated by pulse shaper 28 in correspondence with the edges of the square wave output of squarer 27. Thus, waveform (c) is applied to the reset input of flip-flop 29. Preferably, as shown, at a time after the occurrence of a few pulses of waveform (d), whereas waveform (d) is applied to the set input thereof. As a result, the pulse of waveform (e) is produced at the flip-flop output 33, the leading edge of this pulse being effected by waveform (c) and the accurate trailing edge being effected by the next successive pulse of waveform (d).

I claim:
1. A system for generating accurate pulses representative of each revolution of a rotary element comprising a tachometer disc coupled to said rotary element for rotation therewith, said disc having a first track including a plurality of circumferentially spaced markers and a second track at a different radius than said first track including at least one marker, first sensing means disposed adjacent said first track for generating a sine wave in response to rotation of said markers of said first track past said first sensing means, second sensing means disposed adjacent said second track for generating a once-around pulse in response to rotation of each marker of said second track past said second sensing means, wherein the first and second sensing means and the circumferential positioning of the first and second track markers are disposed to provide the once-around pulse a selected interval of time after initiation of the sine wave generation to thereby permit a plurality of cycles of said sine wave to be generated before the generation of said once-around pulse, first pulse shaping means coupled to said first sensing means for converting said sine wave to a train of high resolution pulses, second pulse shaping means coupled to said second sensing means for converting each of said once-around pulses to a trigger pulse, and a set-reset flip-flop having a set input, a reset input, and an output, said inputs respectively coupled to said first and second pulse shaping means in receiving relation to said train of high resolution pulses and said trigger pulses, said flip-flop providing an output, once-around pulse in response to each of said trigger pulses after said selected interval of time with one time accurate edge thereof determined by one of said high resolution pulses.

2. A system according to claim 1, further defined by said first pulse shaping means including a squarer for converting said sine wave to a square wave, and a pulse shaper coupled to said squarer for generating fast rise time pulses in correspondence with the edges of said square wave.

3. A system according to claim 1, further defined by said tachometer disc being an optical tachometer disc having a plurality of circumferentially spaced alternately transparent and opaque segments defining said first track and a single transparent slit defining said second track, said first sensing means including a light source disposed on one side of said disc to beam light upon said first track and a photocell disposed on the opposite side of said disc to receive light transmitted through said transparent segments of said first track, and said second sensing means including a second light source disposed on one side of said disc to beam light on said second track and a second photocell disposed on the opposite side of said disc to receive light transmitted through said transparent slit of said second track at a time commensurate with said selected interval of time after passage of light by the first transparent segment of the first track.

4. A system according to claim 3, further defined by said first pulse shaping means including a squarer coupled to said first photocell for converting said sine wave to a square wave, and a pulse shaper coupling said squarer to one input of said flip-flop for converting said square wave to a train of fast rise time pulses in correspondence with the edges of said square wave, and said second pulse shaping means including a second pulse shaper coupled to said second photocell for converting said once-around pulses to trigger pulses and a variable time delay coupling said second pulse shaper to the second input of said flip-flop.

References Cited

UNITED STATES PATENTS

| | | | |
|---|---|---|---|
| 2,769,949 | 11/1956 | Stratton | 324—70 |
| 2,688,126 | 8/1954 | Weller | 340—268 |
| 2,796,598 | 6/1957 | Cartwright | 324—70 |
| 3,024,986 | 3/1962 | Strianese | 340—190 |
| 3,195,120 | 7/1965 | Lazecki | 340—271 |

FOREIGN PATENTS 1,191,986  4/1965  Germany.

RUDOLPH V. ROLINEC, Primary Examiner

MICHAEL J. LYNCH, Assistant Examiner

U.S. Cl. X.R.

250—209; 324—70